(12) United States Patent
Hsu et al.

(10) Patent No.: US 9,235,384 B2
(45) Date of Patent: Jan. 12, 2016

(54) LANGUAGE NOTIFICATION GENERATOR (71) Applicant: Axure Software Solutions, Inc., San Diego, CA (US)

(72) Inventors: Victor Hsu, San Diego, CA (US); Martin Smith, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 0 days.

(21) Appl. No.: 14/523,027

(22) Filed: Oct. 24, 2014

(65) Prior Publication Data

US 2015/0089467 A1  Mar. 26, 2015

Related U.S. Application Data

(63) Continuation of application No. 14/035,932, filed on Sep. 24, 2013, now Pat. No. 8,880,999.

(60) Provisional application No. 61/880,697, filed on Sep. 20, 2013.

(51) Int. Cl.
   *G06F 17/00*   (2006.01)
   *G06F 9/44*    (2006.01)
   *G06F 17/24*   (2006.01)
   *G06F 17/22*   (2006.01)
   *G06F 17/30*   (2006.01)
   *G06F 3/0486*  (2013.01)

(52) U.S. Cl.
   CPC ............... *G06F 8/34* (2013.01); *G06F 3/0486* (2013.01); *G06F 9/4443* (2013.01); *G06F 17/2247* (2013.01); *G06F 17/24* (2013.01); *G06F 17/30368* (2013.01)

(58) Field of Classification Search
   CPC .............. G06F 17/30368; G06F 17/43; G06F 17/33472; G06F 8/34; G06F 17/2247; G06F 17/24; G06F 9/4443; G06F 9/542; G06F 3/0486
   USPC .................. 715/234, 255; 717/123, 106, 109
   See application file for complete search history.

(56) References Cited

U.S. PATENT DOCUMENTS 4,809,170 A   2/1989  Leblang et al.
5,583,988 A   12/1996 Crank et al.
(Continued)

OTHER PUBLICATIONS

Homepage, Clicktale, Accessed on Sep. 24, 2013, http://www.clicktale.com/.

(Continued)

*Primary Examiner* — Thu Huynh
(74) *Attorney, Agent, or Firm* — The Mueller Law Office, P.C.

(57) ABSTRACT

Computer-implemented methods relating to interactive graphical designs are provided. One method includes adding a widget to a graphical instantiation of a web page design that is being displayed in a graphical design environment. The method also includes generating an encoded instantiation of the web page design using a compiler and the graphical instantiation. The method also includes rendering the encoded instantiation in a player. A portion of the encoded instantiation is used by the player for an aspect of an interaction between a viewer of the web page design and the widget. The method also includes generating a notification to describe that aspect of the interaction. The notification is a more cogent description of that aspect of the interaction than the portion of the encoded instantiation.

15 Claims, 7 Drawing Sheets

(56) References Cited

U.S. PATENT DOCUMENTS

| | | | |
|---|---|---|---|
| 5,740,440 A | 4/1998 | West | |
| 5,889,988 A | 3/1999 | Held | |
| 6,601,233 B1 * | 7/2003 | Underwood | 717/102 |
| 6,986,124 B1 | 1/2006 | Field et al. | |
| 7,000,150 B1 | 2/2006 | Zunino et al. | |
| 7,174,286 B2 | 2/2007 | Martin et al. | |
| 7,334,114 B2 | 2/2008 | Sohm et al. | |
| 7,349,837 B2 | 3/2008 | Martin et al. | |
| 7,360,202 B1 | 4/2008 | Seshadri et al. | |
| 7,650,592 B2 | 1/2010 | Eckels et al. | |
| 7,661,031 B2 | 2/2010 | Birsan et al. | |
| 7,694,271 B2 | 4/2010 | Becker et al. | |
| 7,788,647 B2 | 8/2010 | Martin et al. | |
| 7,861,158 B2 | 12/2010 | Martin et al. | |
| 7,908,590 B1 | 3/2011 | Min et al. | |
| 7,958,454 B2 | 6/2011 | Gaudette | |
| 8,032,860 B2 | 10/2011 | Piehler et al. | |
| 8,104,044 B1 | 1/2012 | Scofield et al. | |
| 8,196,112 B1 | 6/2012 | Cansizlar | |
| 8,365,149 B2 | 1/2013 | Frank et al. | |
| 8,387,006 B1 | 2/2013 | Taylor | |
| 8,418,130 B2 | 4/2013 | Tittizer et al. | |
| 8,516,366 B2 | 8/2013 | Hicks et al. | |
| 2002/0174415 A1 | 11/2002 | Hines | |
| 2003/0204838 A1 | 10/2003 | Caspole et al. | |
| 2005/0005258 A1 | 1/2005 | Bhogal et al. | |
| 2005/0235264 A1 | 10/2005 | Hines | |
| 2006/0248442 A1 | 11/2006 | Rosenstein et al. | |
| 2007/0168931 A1 | 7/2007 | Martin et al. | |
| 2007/0250618 A1 | 10/2007 | Hammond | |
| 2008/0127149 A1 | 5/2008 | Kosche et al. | |
| 2009/0288004 A1 * | 11/2009 | Strandell et al. | 715/710 |
| 2010/0131327 A1 * | 5/2010 | Hseush et al. | 705/9 |
| 2010/0281459 A1 | 11/2010 | Betouin et al. | |
| 2011/0138291 A1 | 6/2011 | Twiddy et al. | |
| 2012/0110480 A1 | 5/2012 | Kravets | |
| 2012/0174002 A1 | 7/2012 | Martin et al. | |
| 2012/0192151 A1 | 7/2012 | Parkes et al. | |
| 2013/0103740 A1 * | 4/2013 | Tully et al. | 709/203 |
| 2013/0198608 A1 | 8/2013 | Krassner et al. | |
| 2014/0019847 A1 * | 1/2014 | Osmak | 715/234 |

OTHER PUBLICATIONS

Homepage, Google Analytics Official Website, Accessed on Sep. 24, 2013 http://www.google.com/analytics/.

Homepage, KISSmetrics, Accessed on Sep. 24, 2013, https://www.kissmetrics.com/.

International search report and written opinion dated Dec. 17, 2014 for PCT Application No. PCT/US2014/055505.

* cited by examiner

LANGUAGE NOTIFICATION GENERATOR

CROSS-REFERENCE TO RELATED APPLICATIONS

This application is a continuation of U.S. patent application Ser. No. 14/035,932, filed Sep. 24, 2013, which claims the benefit of U.S. Provisional Application No. 61/880,697, filed Sep. 20, 2013, both of which are incorporated by reference herein in their entirety.

BACKGROUND OF THE INVENTION

Design programs allow users to specify various designs such as text documents, web pages, spreadsheets, and illustrations. A common interface for modern design programs is a graphical design environment that allows users to specify the design at the same time as the design is displayed. This mode of design specification is commonly referred to as what-you-see-is-what-you-get (WYSIWYG). This mode of design specification assists the design process because a user is able to constantly preview the design as it is being specified. However, certain designs are too complicated to specify and preview in the same environment. This is particularly true for interactive graphical designs.

Interactive graphical designs, such as web sites, are problematic for graphical design environments because both the design itself and the design environment are interactive. With reference to web page design 100 in FIG. 1, clicking on button 101 for purposes of specifying the design could bring up a widget interface for specifying the characteristics of button 101; whereas clicking on button 101 while the design was being rendered could execute the rendering of a "submit" action in which the information entered in prompts 102 would be accepted and stored for later use by the design. As illustrated, it is difficult to provide both the interactivity of the design environment, and the interactivity of the design itself in a single interface. Furthermore, an instantiation of the design that provided both of these levels of interactivity would be heavily encumbered by its dual responsibility, and would be inefficient if used as a final design. As a result, interactive graphical designs are generally exported from their design environments for rendering in an external player. In the case of a web page, an example of an external player is a web browser used to render the web page design.

Although separating out the design specification and rendering of an interactive graphical design provides for a large advantage in terms of simplifying the design environment, separating the design environment from the rendering environment can make it difficult to figure out how the state of the design in its rendering environment relates back to the design as it was specified. Furthermore, when the design is exported from the design environment it is generally compiled into an encoding in a lower level language so it is difficult to understand how portions of the encoding relate back to this design. Both of these factors can make debugging the design difficult. If the interactive design crashes, or doesn't perform as expected while it is being rendered in a player, the designer will have to back-track to figure out what was wrong with how the design was specified by reloading the design in the design environment. This problem is exacerbated when the exported design is encoded in a lower level language before it is rendered. It is extremely difficult to translate up from a lower level language description of a design to glean a more cogent description of what the lower level language is describing. Therefore, there isn't a simple intermediate link between an aspect of the design as rendered, and its location in the design as specified.

Figure 1:
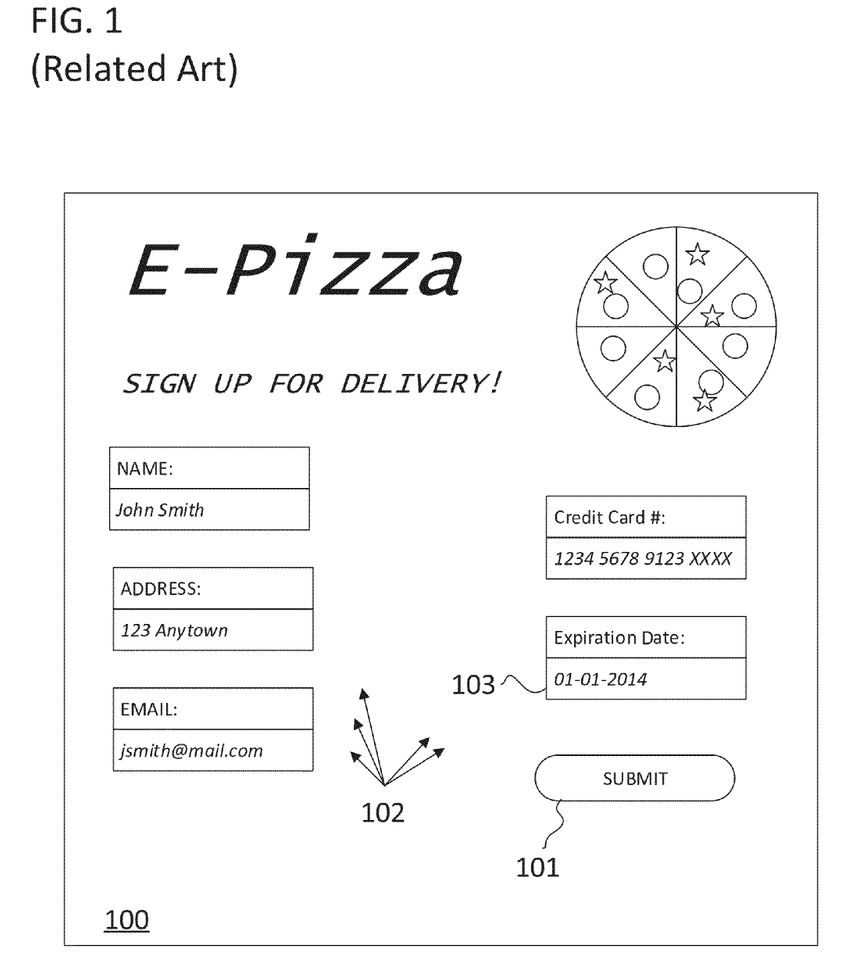
FIG. 1 illustrates an interactive graphical design that can be used to describe concepts found in the related art.

Returning to the example in FIG. 1, a user could have intended the design to only allow a viewer to progress past web page 100 if appropriate data was entered in prompts 102 when button 101 is clicked. A condition placed on prompt 103 by the designer could be that the expiration date of the credit card has to be a date that is later than the current date. If the designer made a mistake while specifying the design, and specified that the expiration date had to be before the current date, the design experience would not match what was expected, and the user would be unable to progress beyond web page 100 even if all of the data in prompts 103 appeared to match the appropriate criteria. However, without a link between the design as specified and the design as rendered, the user could have a difficult time locating what portion of the specified design was causing the problem. As a specific example, a user might not be able to identify which condition was failing in the rendering of a multi-condition interaction.

The related art includes a collection of approaches that seek to provide the user with the ability to determine a link between the performance of an interactive graphical design and how the design was specified. Certain debugging tools allow a user to step through the code that underlies a graphical design as it is being executed in a run time environment. For example, in the particular situation of a web page design, the design could be rendered in an external player and the rendering experience could be paused each time a new segment of HTML was rendered by the browser so that a user could monitor the effect of each segment of the encoding on the design. Users are also able to input manual code into their designs that will output information concerning the current status of their design in combination with the execution of related events while the design is being rendered. The manual code is then manually removed from the design when it is fully debugged.

The related art also includes other methods of providing a link between the underlying design of an interactive graphical design and how that design is executed in an external player. As an example, certain analytics tools will insert code into an encoding of a design such that a notification will be generated when a particular event occurs while the design is being rendered. Referring to the specific situation of an analytics tool for a web page, a segment of JavaScript could be added to an encoded web page design that will generate a notification when a specific value is entered into a text box. As another example, logging tools can save a copy of what portion of the code was executed while a design is being rendered. As such, a user that is rendering a design, and comes across an unexpected occurrence that needs to be debugged, will be able to go back to the log and identify the portion of the code that was responsible for the unexpected occurrence.

SUMMARY OF INVENTION

A computer-implemented method is disclosed herein. The method includes adding a widget to a graphical instantiation of a web page design that is being displayed in a graphical design environment. The method also includes generating an encoded instantiation of the web page design using a compiler and the graphical instantiation. The method also includes rendering the encoded instantiation in a player. A portion of the encoded instantiation is used by the player for an aspect of an interaction between a viewer of the web page design and the widget. The method also includes generating a notification to describe that aspect of the interaction. The notification is a more cogent description of that aspect of the interaction than the portion of the encoded instantiation.

Another computer-implemented method is disclosed herein. The method includes receiving a description for a widget from a user via a widget specification interface. The description describes an aspect of an interactive feature of the widget. The method also includes generating an encoded instantiation of an interactive web page design using a compiler and the description. The method also includes rendering the encoded instantiation in a player which utilizes the interactive feature of the widget. The method also includes generating a notification using the description when the interactive feature of the widget has been utilized.

Another computer-implemented method is disclosed herein. The method includes accepting a set of design specifications from a user. The design specifications define a set of potential response to events for a rendering of an interactive graphical design. The method also includes generating a graphical instantiation of the design while accepting the design specifications. The method also includes generating an encoded instantiation of the design using a compiler and the graphical instantiation. The compiler incorporates a non-executable description of an event in the set of potential responses to events into the encoded instantiation. The method also includes rendering the encoded instantiation of the design using a player. The method also includes executing the event using a portion of the encoded instantiation and the player. The method also includes generating a notification to indicate the occurrence of the event using the non-executable description. The notification is a more concise representation of the event than the portion of the encoded instantiation.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

The invention relates generally to tools for generating interactive graphical designs using a graphical design environment, and more specifically to the automatic generation of notifications to assist in the design or evaluation of interactive graphical designs. Some of the tools disclosed herein can be used to generate notifications regarding the state of an interactive graphical design as it is being rendered. The notifications can describe events, conditions evaluated in response to the occurrence of those events, actions taken in response to either the occurrence of those events or the result of those evaluations, and the values of design status variables that describe a state of the interactive graphical design. These notifications can be used to debug, conduct analytics on, or visualize usage patterns of the interactive graphical design.

Figure 2:
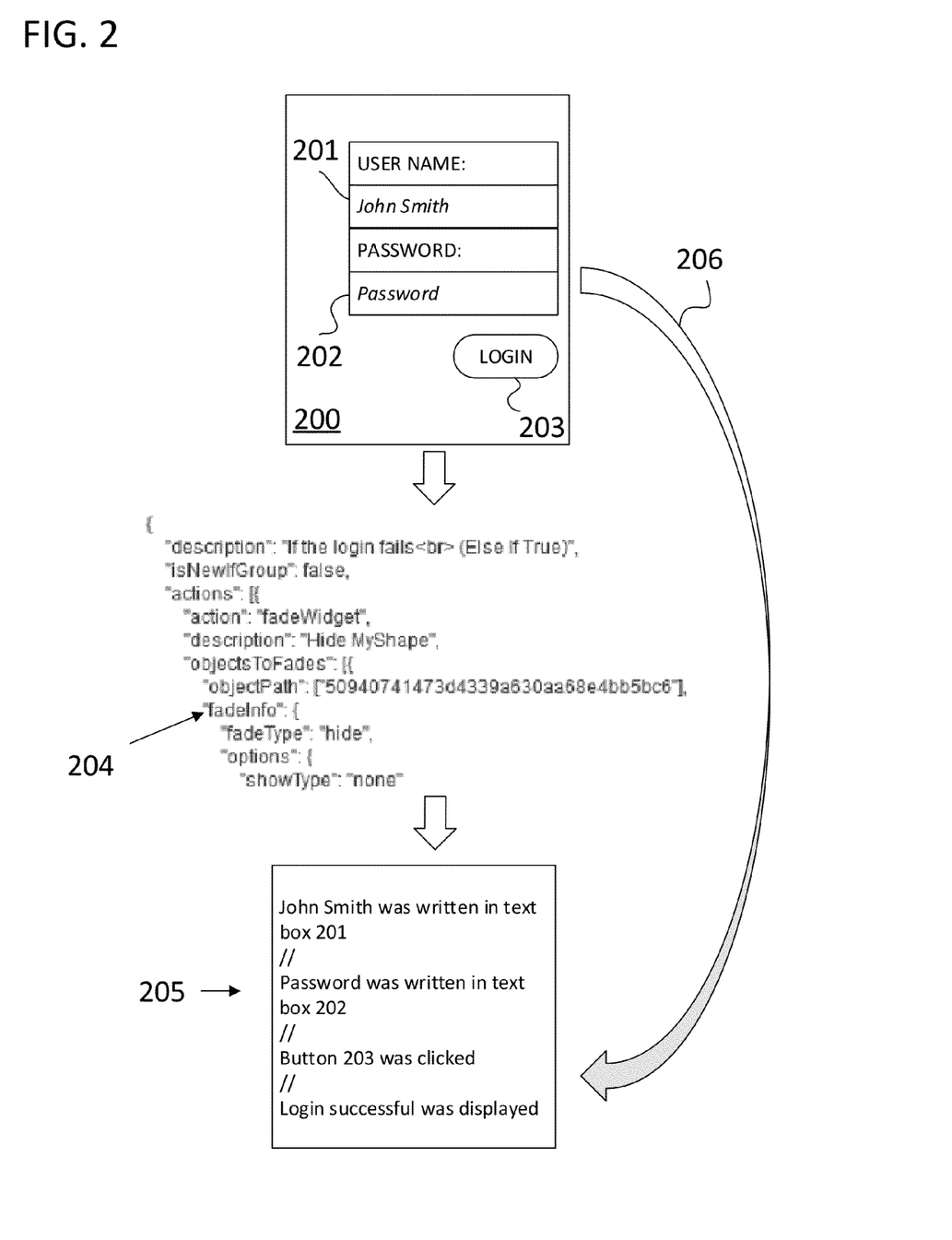
FIG. 2 illustrates a block diagram of the interrelationship of a design in a graphical user interface, an encoded instantiation of that design, and notifications concerning the status of that design as it is being rendered.

The notifications can be furnished to the user in a language that is at the same level as the language used to specify the design in the graphical design environment. In situations where an encoded instantiation of the design is exported from the graphical design environment, the notification language will generally be at a higher level than the language used for the encoded instantiation of the design. In other words, the notification language will be more easily understandable than the encoding itself. The notification language could be a more cogent description of the status of the design or it could simply be a more concise description. A specific example of this concept can be described with reference to the design of a login interface 200 for a web site as illustrated in FIG. 2.

Login interface 200 includes a username prompt 201, password prompt 202, and a confirmation button 203, as they would appear in an interactive graphical design environment. The user could have specified login interface 200 by pulling in widget form field boxes for prompts 201 and 202, and a button widget for button 203. Through the use of various interfaces, the user could have then specified the relationship between these widgets as follows: "If John Smith is entered in form field box 201, Password is entered in form field box 202, and button 203 is clicked; Then display the text Login Successful." This interactive design could be exported from the design environment to generate an encoded instantiation of the design which includes code segment 204. The instantiated design would be generated in a lower level language (i.e., it may be easier for a machine to execute, but it would be more difficult for a human evaluator to comprehend).

In accordance with some of the tools and approaches described herein, the notifications 205 that are generated when the encoded instantiation is used to render the interactive design could be at the same level as the design in its originally specified form. The notification could describe: events (e.g., "Button 203 was clicked"); evaluations (e.g., "John Smith is in text box 200"); and/or actions (e.g., "The text 'Login Successful' was displayed"). It would be exceptionally difficult for a machine to translate code segment 204 upwards to generate notifications 205. Translating code upwards to a level that is more amenable to human consumption requires an understanding of what the design was intended to mean to a human being, which is something that machines are not yet able to do in a flexible and reliable manner. However, some of the tools and approaches described herein avoid this problem by utilizing translation path 206, which allows the information necessary to generate a high level notification concerning the state of the interactive design 200 to be preserved from the original design when the design is rendered in an external player.

Figure 3:
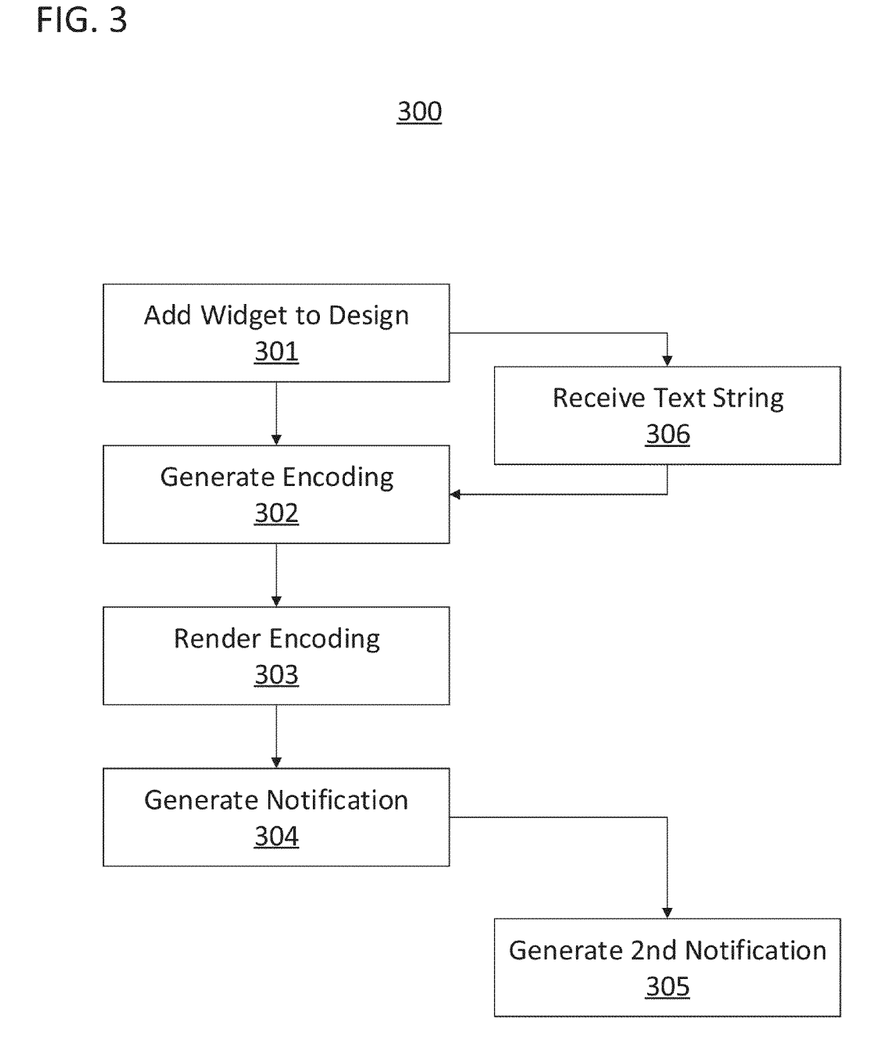
FIG. 3 illustrates a flow chart of a method for generating notifications concerning the status of an interactive graphical design.
Figure 4:
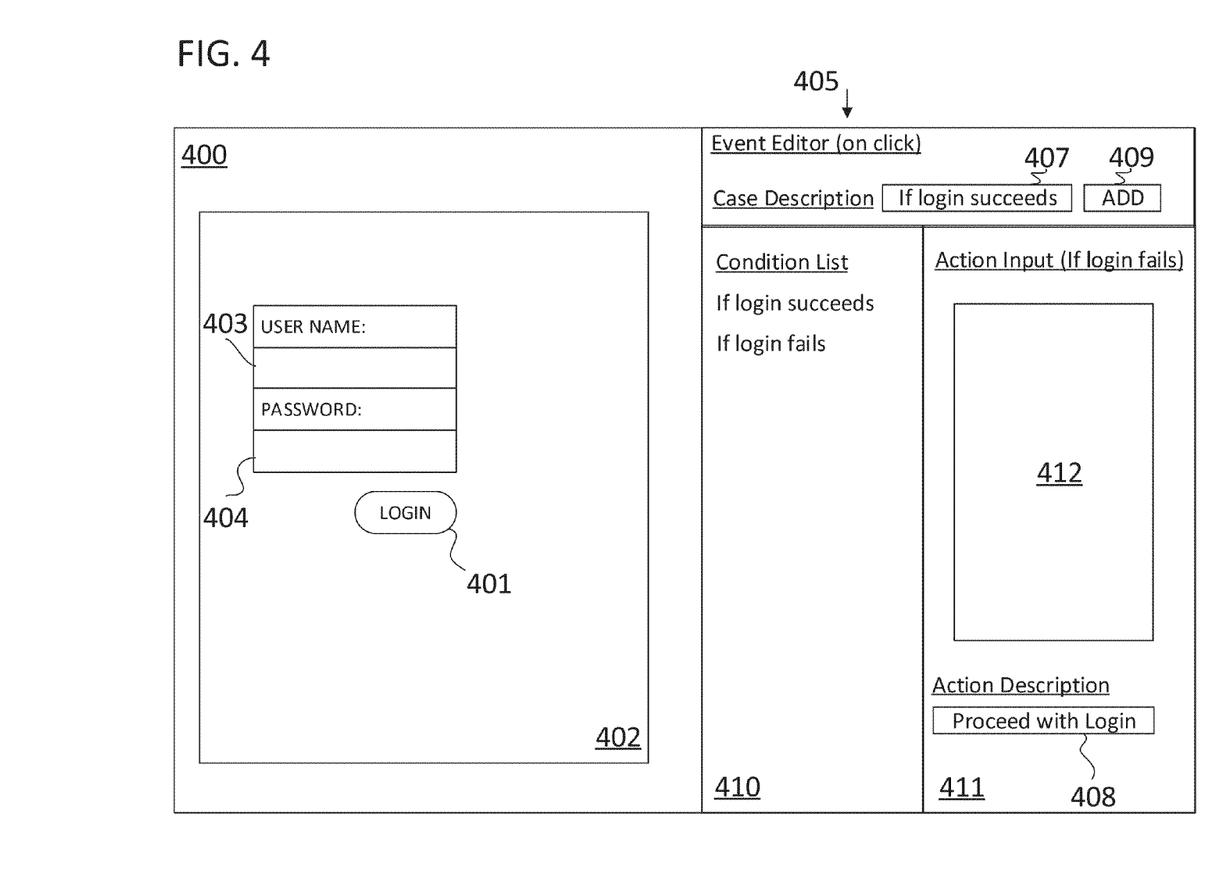
FIG. 4 illustrates a graphical user interface for specifying an interactive graphical design that includes interactivity aspect description interfaces.

Computer-implemented methods that generate notifications as described in the preceding paragraphs can be described with reference to FIGS. 3 and 4. FIG. 3 displays method 300 that spans the process of generating notifications from when the design is specified in a graphical design tool through to when the notifications are generated as the design is being rendered in a player. FIG. 4 illustrates a graphical design environment 400 that can be used to specify the design in accordance with the first steps of method 300.

Method 300 beings with step 301 in which a widget is added to a graphical instantiation of a web page design that is being displayed in a graphical design environment. In the context of web design, the widget could take various forms such as a button, a text box, a form field box, a menu, the web page itself, a display window, a link, or any design element. The widget can be added from a library of widgets available in the graphical design environment. For example, the widget could be selected from a widget selection interface via a drag and drop selection or a single click on a widget identifier in a list of available widgets. FIG. 4 displays graphical design environment 400 such that the widget referred to in step 301 could be button 401 having been added to graphical design instantiation 402. Graphical instantiation 402 displays the current state of the design as it is being specified by the user. In this case, the design includes username prompt 403 and password prompt 404 in addition to button 401 because all three widgets were previously added to the design by a user. Widgets can be added and taken away from the design, and they can be edited in numerous ways while in the design. Interfaces for allowing a user to edit the widgets could appear in response to a selection of the widget using a standard user interface selection such as a left mouse click. These interfaces can change depending upon which properties of the widget the user was specifying. As illustrated in FIG. 4, graphical design environment 400 illustrates button widget 401 selected for editing and, in particular, the case properties of the widget are displayed for being edited.

Method 300 proceeds through two additional steps before notifications are generated in step 304. An encoded instantiation of the design is generated in step 302 using a compiler and the graphical instantiation that was specified by the user in step 301. Next, step 304 is conducted simultaneously with step 303, in which the interactive design is rendered in a player using an encoded instantiation of the design. The encoded instantiation can be generated by a compiler in step 302 in response to a command received from the user to export the encoded instantiation from the graphical design environment. The encoded instantiation can be a text file comprising an encoding written in HTML or JavaScript. The encoded instantiation can be encoded using any type of machine language, but certain benefits accrue to approaches in which the encoded instantiation is written using a lower level language than the graphical design as it is specified in the graphical design environment. The encoded instantiation can also be generated by a compiler in response to a command to render the graphical design simultaneously with its generation. An example of this approach would be conducting step 302 using a player incorporated into the graphical design environment itself that did not require the design to be exported before being rendered.

The notifications produced in step 304 can provide information about the state of the interactive graphical design as it is being rendered in step 303. The content of the notifications can match that described with reference to FIG. 2. In particular, the notifications can provide information about any aspect of an interaction that the widget is designed to facilitate. The aspect of the interactivity of a widget could be the occurrence of an event the widget was listening for, a condition that was evaluated in response to the event, a design variable that was used in that evaluation, an action taken in response to the evaluation, or an action taken in response to the event. For example, when rendering an encoded instantiation of the design specified in environment 400, a notification could display "Button 401 was clicked" to describe the event the button was waiting for. The notification could also display a design state variable with text such as: "Button 401 was clicked for the fifth time without a successful login." The notifications could essentially display any information concerning any aspect of the interactivity of the widgets in a design, and thereby can essentially display any information relating to any possible aspect of the interactivity of the entire design. The notification could be a presentation of data such as "Button 401 clicked/User Name=John Smith" or the notification could be a description in prose such as "When button 401 was clicked, the user name field contained the text 'John Smith'. In general, the notifications could contain any data about the current state of the design as it is being rendered including the variable values, form field values, or the visibility states of a widget in the design.

Numerous notifications can be generated while the design is being rendered. For example, step 304 could be followed by step 305 in which a second notification was generated. The notifications can both be generated based on the occurrence of a single event, the result of a single evaluation, or the performance of a single action in the design as it is being rendered. For example, the notification generated in step 304 could state the result of an evaluation while the notification generated in step 305 could provide the value for a design status variable that was utilized to conduct the evaluation. In keeping with the example of FIG. 4, the notification in step 304 could state that a login request was successful and the notification in step 305 could provide the value of the text string located in username prompt 403 when the successful login evaluation was conducted. These notifications could be generated at the time of the event, action, or evaluation. The notifications could also be generated prior to or after the time of the event, action, or evaluation. The notifications could be generated in real time or they could be batch generated such that an event that triggered steps 304 and 305 would occur, and a set amount of time will pass before steps 304 and 305 were conducted as part of a batch process.

The notifications that are generated in step 304 are generated using different approaches based on how steps 301, 302, and 303 are executed. Some of these approaches utilize translation pathway 206 to generate the notifications. Widget specification interface 405 in FIG. 4 can be described in combination with method 500 in FIG. 5 to illustrate a set of approaches in which descriptions entered by users in the graphic design environment are used to generate the notifications. Method 500 begins with step 501 in which a widget description is received from a user via a widget specification interface. The description received from the user describes an aspect of an interactive feature of the widget. The aspects of the interactive feature of the widget for which a description can be received can be any of the aspects described above including those associated with events, conditions, variables, and actions.

The widget specification interface in which the descriptions are entered by the user can take on various forms. For example, the descriptions could be selected from a list of potential descriptions that are associated with certain aspects of the widget's interactivity. The descriptions could also be entered in a text box provided to the user in a widget specification interface. As illustrated in FIG. 4, a description of a particular evaluation results, referred to herein as a case, can be entered in notification description interface 407, and a description of a particular action that can be taken in response to that evaluation result can be entered in action description interface 408. The description for the case can be used to produce the notification for the result of the triggered evaluation with minor modification. Cases are entered in widget description interface 405 by entering text in notification description interface 407 and clicking on button 409. The cases are then displayed in the condition list 410. A particular case can then be selected and action input interface 411 will allow a user to specify actions to be taken, in response to the selected condition, by specifying an action in action specification interface 412, and a description for the action in action notification description interface 408. Although not shown in FIG. 4, widget specification interface 405 could provide text boxes for entering in descriptions of any aspect of the widget's interactive characteristics.

Figure 5:
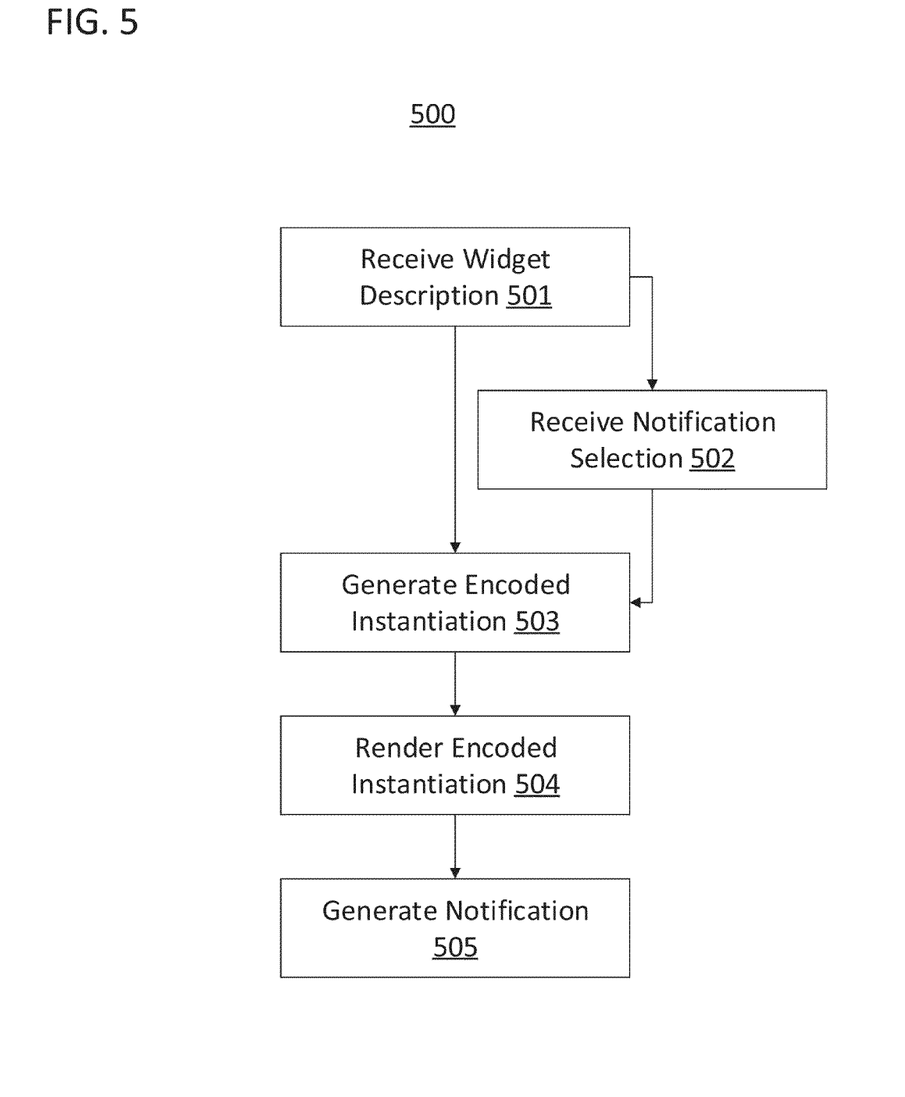
FIG. 5 illustrates a flow chart of a method for generating notifications concerning the status of an interactive graphical design using a description interface.

The descriptions entered by the users can be used to generate notifications concerning the design as it is being rendered. For example, a text string entered into action input interface 411 can be combined with additional formatting and be displayed when the described action is executed. This can be achieved by utilizing the widget interaction aspect descriptions to generate the encoded instantiation in step 502. The text strings could be encoded as non-executable portions of the encoded instantiation that are to be displayed along with the design as it is rendered in a player. When the encoded instantiation is rendered in a player in step 504, and the interactive feature that the widget description describes is utilized, the corresponding notification could be generated in step 505 using the description that is embedded in the encoded instantiation. In approaches where the design is rendered without being exported, the notifications could still be generated using the descriptions entered by the user, they would just need to be delivered to the player along with the corresponding event, action, or comparison. In keeping with the example of FIG. 4, the text string entered in action notification description interface 408 could be displayed to the user when the button 401 was selected, the proper values were in prompts 403 and 404, and a successful login action was then conducted.

The description entered into notification description interfaces in the graphical design environment can be used to generate the appropriate notification while the corresponding design is being rendered in various ways. In the most basic example, the text could be displayed directly (i.e., the text string "The login button was clicked" could be input as the notification description for an event listener and the notification "The login button was clicked" could be displayed while the design was being rendered and button 401 was clicked). The descriptions could also be combined with additional language and language process rules to make the notifications more readable and or a more accurate description of the aspect of the widget's interactivity they were meant to describe. For example, the rule could be that the word "if" is removed from the front of the case description to generate the notification such that "If login succeeds" was modified to produce the notification "Login succeeds." As another example, language processing rules could change the tense of verbs in the case descriptions to produce the notifications such that the text "Login succeeds" would be translated to "Login succeeded." The description could also be combined with a design status variable that was used when a condition was evaluated in response to the event. For example, a user could specify a condition that the text string in the password prompt should equal the word "password" for a successful login, and could enter the text "Proceed with login" in notification specification interface 408 while the generated notification would be the text string "Proceed with login because Password=password." Therefore, the user could enter sparse descriptions into notification specification interfaces and still get a clear picture of the state of the design as it was being rendered from the notifications.

The notifications could also be generated in step 304 by leveraging prior knowledge regarding the potential events, occurrences, and actions for the design elements in a given design environment. Design environments with a limited number of potential types of widgets that can be added to a given design would be particularly useful in these situations. With a limited number of widgets, the design environment could include a preset description for every kind of action that a widget in the design could take such that users would not need to enter descriptions into the design environment. In related approaches, the notifications could be generated by leveraging knowledge regarding this predefined set of potential events, conditions, and actions. As a basic example, a widget in the widget library of a design may only have two possible actions that can be selected for the widget to execute in response to the event associated with the widget—the widget could either show a light box or transfer the design to a different page in response to a click. The widget would then come pre-stocked with the following two action descriptions: "In response to the click on the widget, a light box was shown" or "In response to the click on the widget, a new page was displayed." This example can be expanded out to widgets having any number of potential associated events, conditions, or actions—although it would become more difficult to preload all of the necessary descriptions as the number and complexity of potential interactions increased.

As described previously, the notifications generated in steps 304 and 505 will generally be at a higher level than the encoded instantiation generated in steps 302 and 502. As a result, the notifications will also be a more cogent or concise description of an aspect of the interactivity of the widget than the portion of the encoding utilized by the player to render the corresponding aspect of the widget's interactivity. The approaches above offer ways in which notifications can be generated such that they appear to have been generated by a natural language speaker that has a full understanding of the state of the design. Another way that the notifications can appear as if they were generated by a natural language speaker is to employ the use of a natural language translator operating on the encoded instantiation. As code is utilized by the player to render the design, the natural language translator could monitor the utilized code and provide a natural language description of what the code was being used for and the resulting effect the code had on the state of the interactive design. These notifications could be produced as full natural language sentence to give the appearance of a trained code analyst describing the state of the design as it was being rendered. When used in combination with design environments in which the design is exported from the design environment in the form of a generated encoded instantiation, these approaches would have a significant benefit over certain other approaches because the natural language translator would not need to rely on cues compiled into the code to determine what the code was doing. The evaluated design in these approaches would therefore be closer to the lean version of the design that was meant to be used when all debugging and analytics are not required (e.g., when the design was ready for release as a finalized project).

A specific example of a natural language translator operating on the encoded instantiation would be a guided translator designed to operate specifically with the graphical design environment and the code generated in the export step. By leveraging knowledge regarding the compiler used to produce the encoded instantiation of the design, as well as knowledge of the language used in the encoding, a natural language translator could be guided such that it did not have to render meaning from the encoded instantiation alone. Instead, the translator could be designed to recognize code segments with specific keywords and parse text following such key words to construct the required notifications. For example, if a notification generator detected that a certain portion of the code was utilized by the player, the translator could examine the code and generate a corresponding notification. If the code were: "action": "ShowWidget", "ShowInfo": "show", "options":{"duration":500}, then the notification generator would be able to leverage knowledge regarding the coding language to generate the more cogent notification "A show widget action was performed to show a widget for 500 ms." The natural language translator would not need to understand what the design was performing to produce this notification as long as a notification generator was used with adequate text parsing ability and knowledge of the code syntax used for the encoded instantiation.

Users can also modify what notifications are generated by a design while it is being rendered. For example, a user may be able to access a global or widget level notification specification interface to turn certain notifications on or off. When the notifications are turned off, the design tool could assure that the corresponding notifications were suppressed. The notifications could be suppressed in various ways. For example, the natural language translator could be programmed to ignore certain segments of the code when specific interactivity aspects manifested in a design. As another example, the notification step could be received prior to the generation of the encoded instantiation as in step 502 of FIG. 5. In this situation, the compiler could utilized the notification specification received in 502 to limit which widget interaction aspect descriptions entered in 501 were used in step 503 to generate corresponding notification text in the encoded instantiation. For example, the notification specification could specify that all notifications associated with a specific widget should be suppressed. In the alternative, the notification specification could specify that all notifications of a specific type are to be suppressed. In this alternative, a user could specify that notifications that describe any action taken, condition evaluated, or event occurrence would be suppressed while other kinds of notifications would be unaffected.

Notification selection inputs can be provided in various ways. For a global selection, a list of potential kinds of notifications could be listed with corresponding check boxes, and notification types that were to be suppressed could be selected by placing an "x" in the check box of one of the boxes in the list. For a per widget notification selection input, the selection could be made while a widget was being specified. For example, a single check box could be located on a widget characterization interface such that if the check box were to be selected, all notifications associated with the widget would be suppressed. In the alternative to or in combination with the check box, the notification selection could be made even more granular by allowing a user to select specific kinds of notifications to be suppressed for a particular widget while editing the widget.

One benefit of being able to suppress the generation of notifications is that the same process can be used to generate a final version of the design without the notifications. This is particularly true in situations in which the notifications are generated in part by embedding notification text in the code because suppressing their generation will make compiling the design faster. In addition, the design can quickly be switched back and forth between a lean encoded instantiation to be used as a final version of the design, and a version that is somewhat slower but facilitates debugging and analytics efforts. This can be useful because often a designer will determine that a design is finished only to find that it needs to be modified again due to an unexpected bug or error.

The notifications can be used for numerous purposes. The notifications can be used to inform a user of the current status of the design as it is being rendered and, therefore they can be used for debugging the design. The notifications can be displayed in a list format in a separate window from the design as it is being rendered or they can be displayed overlaid on the design as it is being rendered. The notifications can also be saved for later purposes or they can be "listened to" by other services. The kinds of services that can listen to the notifications as they are being generated include debuggers, analytics tools, and recording tools.

Figure 6:
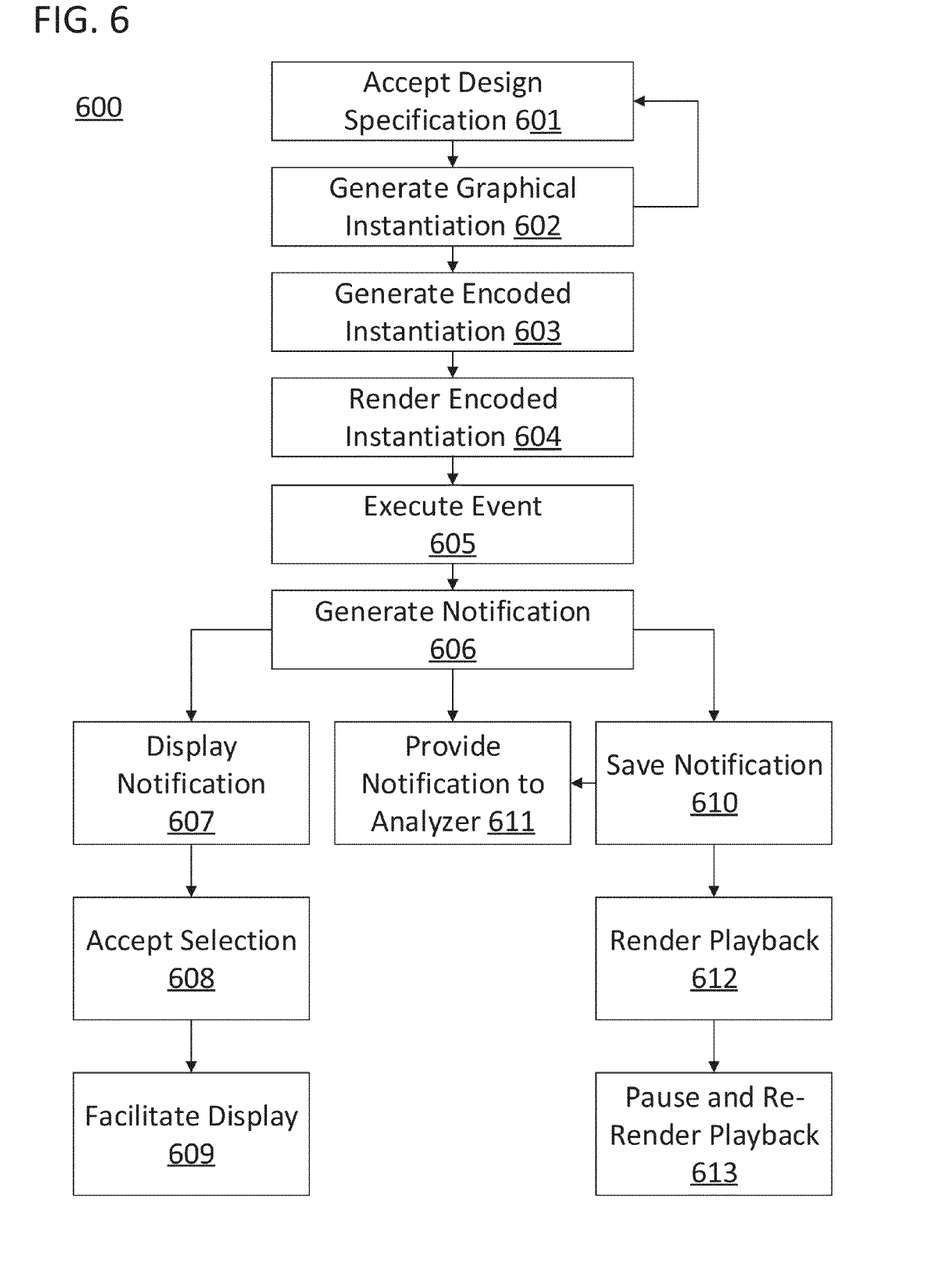
FIG. 6 illustrates a graphical user interface for specifying a notification specification that allows a user to specify notifications that should not be generated.

A computer implemented method for generating notifications to be used in the manner described in the previous paragraph can be described with reference to method 600 in FIG. 6. Method 600 begins with step 601 in which a set of design specifications is accepted from a user where the design specifications define a set of potential events for a rendering of an interactive graphical design. The method continues with step 602 in which a graphical instantiation of the design is generated while the design specifications are being accepted from the user. Step 601 and step 602 can therefore be executed simultaneously or various iterations of the two steps can be executed in series until the entire design has been specified. The method continues with step 603 in which an encoded instantiation of the design is generated using a compiler and the graphical instantiation. In step 603, the compiler incorporates a non-executable description of an event in the set of potential events into the encoded instantiation. The method continues with step 604 in which the encoded instantiation of the design is rendered in a player. The player can be internal to a graphical design environment in which the design was specified or it can be an external player. The method continues with step 605 in which an event is executed using a portion of the encoded instantiation of the player. The method then continues with step 606 in which a notification is generated to indicate the occurrence of that event using the non-executable description. The notification is a more concise representation of the event than the portion of the encoded instantiation associated with the event. For example, the portion of the encoded instantiation could be a computer-language encoding of all the properties of an event while the notification was a description of the event in plain language.

The notifications that are generated in step 606 can be utilized by a debugging tool to facilitate the design and analysis of the graphical design. As such, method 600 can continue with step 607 in which the notification generated in step 606 is displayed to the user in a debugging interface. The debugger can be independent of the graphical design tool such that the encoded instantiation is exported from the tool and analyzed separately from the graphical design environment. The notification can take on any of the characteristics described above with reference to steps 304 and 505. In addition, the notification could be displayed in a manner that indicated portions of the notification could be selected. For example, in the notification: "Widget 1 was clicked," the word "Widget 1" could appear in distinguishable selectable text such that a user was provided with a visible cue that the text could be selected. Upon selecting the text in the debugging interface, the user could be taken immediately to the location of widget 1 within the graphical design environment and be provided with the widget specification interface for widget 1. The same approach could be taken if the notification included a value for a variable in the interactive graphical design when the event is executed in the player. In step 608 of method 600, a selection of the text for that value could be accepted from the user which would trigger the execution of step 609 in which a portion of the interactive graphical design associated with the event that modified or triggered the evaluation of that value would be displayed to the user immediately so that they could track where the notification came from in the original design.

The notifications that are generated in step 606 could also be saved to memory in step 610 as the design is being rendered. As multiple notifications were stored, the resulting collection could be used to describe an interactive session between a viewer of the design and the interactive design. Once saved, the notifications could be used for multiple purposes. For example, the notifications could be provided to an analytics tool as in step 611. The notifications could also be provided to the analytics tool in a real time basis as they are generated—that is why step 606 is also connected directly to step 611 in method 600. The analytics tool will be able to collect the notifications, and determine how the design was utilized during the interactive session. The analyzer could also receive notifications from multiple instantiations of the design as they are being used by multiple users over a given period of time. In a specific example, the design will be available for use on a server and multiple users will be able to render an interactive session with the design using their own players. The notifications generated by each of these sessions could then be saved or sent directly to the analytics tool to analyze how the design was used by the various users. For example, the analytics tool could determine how many times a specific link was selected in a design, or determine the value of a status variable when those links were clicked such as how many items were in an electronic shopping cart widget, or how many other pages in the design had been visited before the link was selected.

The saved notifications could also be used to playback the interactive session by using the design, the notifications, and a specialized playback tool configured to read back the notifications as instructions for rendering an interactive session. In step 612, the notifications saved in step 610 are used to render a playback of the saved interactive session. The session could be played back to illustrate how the design functioned and to facilitate discussions of how the design could be improved. The benefit of this approach over simply recording an image of the interactive session and playing it back is that the design will remain interactive, and at any time the play back can be paused and edited before an alternative interactive session is played from that point forward.

In step 613, the rendered playback is paused upon the receipt of a request to pause the playback. The playback tool could then allow the user to interact with the design as if it was just being rendered in a player at that state. For example, the playback can be paused just before a user adds a hat to an electronic shopping cart widget. The viewer of the playback can then take control of the interactive session and instead place a pair of shoes in the shopping cart. However, the playback tool could also allow the user to enter in different variables for certain design status variables that would not usually be accessible to a user interacting with the design as it was being rendered. For example, consider a design for a login screen that was specified so that the design sent the user to a lock out screen after six failed login attempts. The playback tool could pause the session after a single failed login attempt, receive a variable modification request to set the number of failed attempts to six, and then re-render the encoded instantiation to create an alternative playback of the interactive session in which the next attempt would fail whereas it succeeded in the original interactive session. Notably, in situations where the design variables can be changed, the playback tool and the notifications could get out of sync, at which point the playback tool could alert the user and provide them with the opportunity to return to the point at which the playback diverged from the original interactive session so that the user could continue viewing the interactive session using the stored notifications from that point on.

Although the playback functionality described above was discussed as applying to the presentation of a design, or for facilitating a collaborative discussion of how to improve the design, the same functionality could be used for debugging purposes. To facilitate debugging, the playback could be paused just before a bug or error occurs in the interactive session, and different scenarios could be analyzed to more accurately determine the cause of the error. For example, different design variables could be selected or different user inputs could be provided to the design to see which cases causes the error being analyzed, and which do not. Furthermore, the playback tool could additionally allow the user to record additional notifications generated while the user took an alternative route so that multiple interactive sessions based off of the same original session could be saved, played back, and analyzed with a high degree of flexibility. As another example, the playback could be applied to a new version of a prototype to analyze how any changes affected the original design. Debugging the changes would be facilitated thereby because, if the playback malfunctioned while rendering a particular interaction, the designer would know that whatever changes were made between the original design and the new version were the cause of that failure.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. Furthermore, nothing in the disclosure should indicate that the invention is limited to systems and methods that involve web browsers. In general, any diagrams presented are only intended to indicate one possible configuration, and many variations are possible. Those skilled in the art will also appreciate that methods and systems consistent with the present invention are suitable for use in a wide range of applications encompassing any related to interactive graphical designs.

Figure 7:
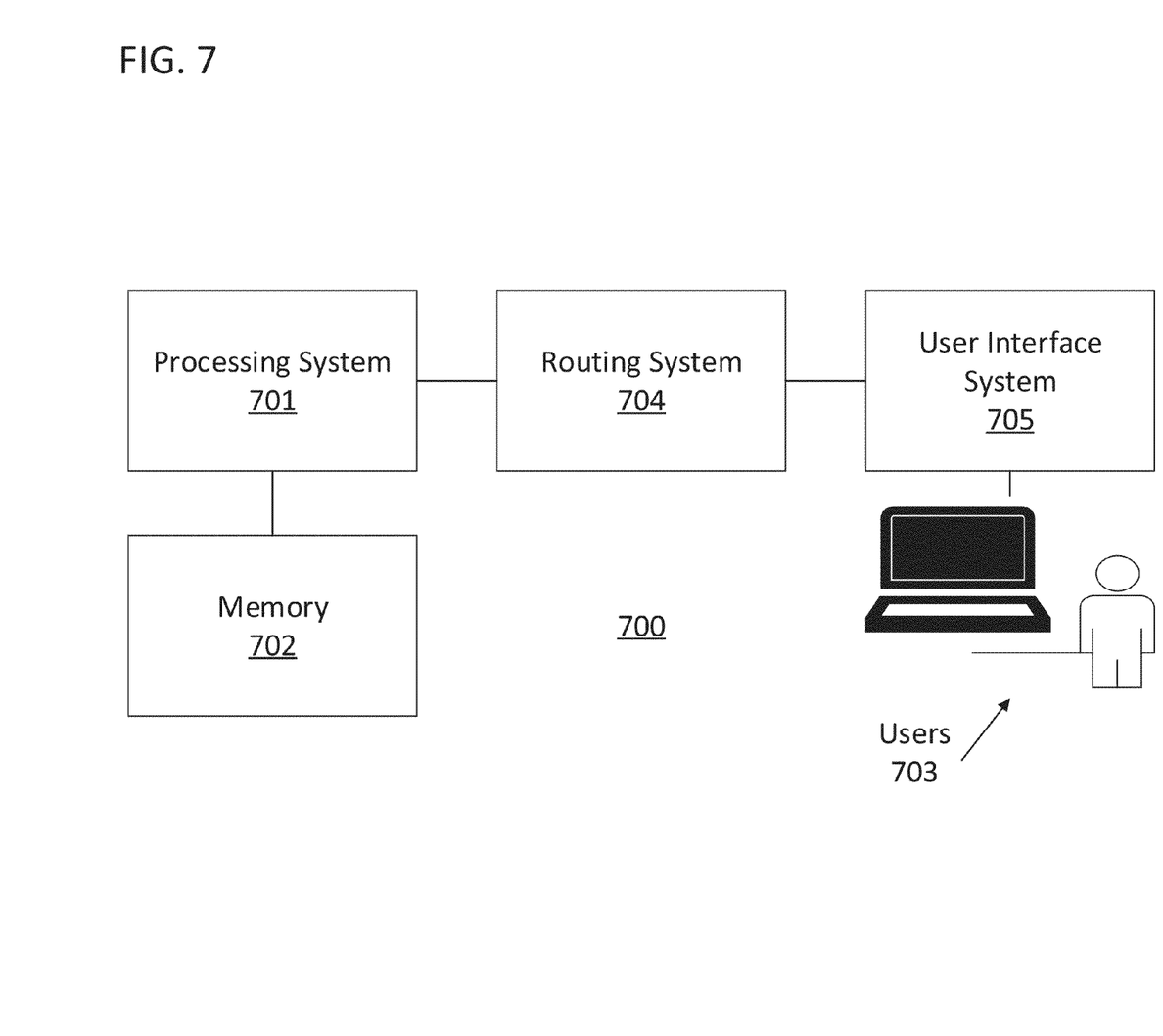
FIG. 7 illustrates a flow chart of a method for generating and utilizing notifications concerning the status of an interactive graphical design in various ways.

Any of the methods described herein can be conducted through the use of a computer system 700 as shown in FIG. 7. For example, the design environment could be provided by a processing system 701 acting in tandem with a memory 702. A user 703 would be able to access the design environment through the use of a routing system 704 and a user interface system 705. Any method steps involving providing or accepting things to and from a user can be conducted using interface system 705. Any method steps involving executing an action can be conducted using processing system 701 alone or in combination with memory 702. FIG. 7 is only an illustrative computer system that is amenable to operation in accordance with embodiments of the present invention and variant computer system topologies may be used in its stead. Nothing in this description should limit the processor of processing system 701 to a single processor, as the function of this block can be accomplished by multiple physical processors located either on a single work station or server, or distributed through a network. It is not essential for memory 702 to be physically distinguishable from processing system 701, as they are merely illustrated as separate blocks for purposes of invoking common conceptions of how computing systems operate. Routing system 704 could be the internal routing system of a single work station, a LAN, a WAN, a wired or wireless network, the Internet, or any other system capable of routing signals. User interface system 705 could be a work station, a computer, a mobile phone or other mobile device, or any computing device or group of computing devices capable of receiving inputs from a single user or group of users. FIG. 7 should also not be taken to indicate that the invention can only involve design environments or design programs that may only be accessed by one user as there could be multiple users 703 and that group of multiple users 703 could access the design environment using any number of routing systems 704. Those users could also access the design environment simultaneously.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A computer-implemented method comprising:
accepting a set of design specifications from a user, the set of design specifications defining a set of potential responses to events for a rendering of an interactive graphical design;
generating a graphical instantiation of the interactive graphical design while accepting the set of design specifications;
accepting a notification description text input from the user, wherein the notification description text input is received in a widget specification interface for a widget in the interactive graphical design;
exporting an encoded instantiation of the interactive graphical design using the set of design specifications;
executing a response to an event in the set of potential responses to events multiple times using a portion of the encoded instantiation as the encoded instantiation is independently rendered by a set of multiple users;
generating a set of notifications, wherein each notification in the set of notifications indicates an execution of the response to the event;
storing the set of notifications in a memory as a set of stored notifications;
providing the set of stored notifications to an analytics tool; and
analyzing how the set of multiple users interacted with the design using the analytics tool;
wherein the set of notifications is generated using the notification description text input;
wherein the notification is a more concise representation of the response to the event than the portion of the encoded instantiation.

2. The method of claim 1, wherein the method further comprises:
visualizing a usage pattern of the interactive graphical design using the set of stored notifications.

3. The method of claim 1,
wherein the method further comprises:
receiving a drag and drop command from the user to add the widget to the interactive graphical design;
wherein the widget is a page;
wherein each notification in the set of notifications is generated in real time; and
wherein the analytics tool batch-processes the set of stored notifications to determine how often a link in the design was selected.

4. The method of claim 1,
wherein the method further comprises:
receiving a drag and drop command from the user to add the widget to the interactive graphical design;
wherein the widget is a button;
wherein each notification in the set of notifications is generated in real time; and
wherein the analytics tool batch-processes the set of stored notifications to determine how often the button was clicked.

5. The method of claim 1,
wherein:
the set of notifications is generated in a batch-process after executing the response to the event multiple times.

6. A computer-implemented method comprising:
accepting a set of design specifications from a user, the set of design specifications defining a set of potential responses to events for a rendering of an interactive graphical design;
generating a graphical instantiation of the design while accepting the set of design specifications;
accepting a notification description text input from the user, wherein the notification description text input relates to a response to an event in the set of potential responses to events, and the notification description text input is received in a widget specification interface for a widget;
exporting an encoded instantiation of the interactive graphical design using the graphical instantiation of the design and the notification description text input;
executing the response to the event in the set of potential responses to events multiple times using a portion of the encoded instantiation as the encoded instantiation is independently rendered by a set of multiple users;
generating a set of notifications using the notification description text input, wherein each notification is generated in response to an execution of the response to the event;
providing the set of notifications to an analytics tool; and
analyzing how the set of multiple users interacted with the interactive graphical design using the analytics tool;
wherein the notification is a more concise representation of the response to the event than the portion of the encoded instantiation.

7. The method of claim 6, wherein the method further comprises:
visualizing a usage pattern of the interactive graphical design using the set of stored notifications.

8. The method of claim 6,
wherein:
the set of notifications is generated in a batch-process after executing the response to the event multiple times.

9. The method of claim 6,
wherein the method further comprises:
receiving a drag and drop command from the user to add the widget to the interactive graphical design; and
storing the set of notifications in a memory as a set of stored notifications;
wherein the widget is a page;
wherein each notification in the set of notifications is generated in real time; and
wherein the analytics tool batch-processes the set of stored notifications to determine how often a link in the design was selected.

10. The method of claim 6,
the method further comprising:
receiving a drag and drop command from the user to add the widget to the interactive graphical design;
wherein the widget is a page;
wherein each notification in the set of notifications is generated in real time; and
wherein the analytics tool batch-processes the collection of stored notifications to determine how often a link in the interactive graphical design was selected.

11. A computer-implemented method comprising:
accepting a set of design specifications from a user, wherein the design specifications define a rendering of an interactive graphical design, and wherein the interactive graphical design exhibits an interaction while rendered;
generating a graphical instantiation of the design while accepting the set of design specifications;
exporting an encoded instantiation of the design using the graphical instantiation of the design;
rendering the encoded instantiation of the design using a player;
executing the interaction using a portion of the encoded instantiation and the player;
generating a notification to indicate an occurrence of the interaction;
facilitating the display of the notification to the user in a debugging interface;
accepting a selection of the notification from the user in the debugging interface;
facilitating the display of a portion of the interactive graphical design associated with the interaction in response to the selection;
storing the notification in a memory as a stored notification; and
providing the stored notification to an analytics tool;
wherein the notification is a more concise representation of the interaction than the portion of the encoded instantiation;
wherein the notification includes a value for a variable in the interactive graphical design when the interaction was executed by the player;
wherein the stored notification is stored in the memory with a set of stored notifications; and
wherein the set of stored notifications describes an interactive session between a viewer and the interactive graphical design.

12. The method of claim 11,
the method further comprising:
accepting a notification description text input from the user, wherein the notification description text input relates to an aspect of the interaction;
wherein the generating of the notification to indicate the occurrence of the interaction is conducted using the notification description text input.

13. The method of claim 11,
wherein the aspect of the interaction is one of:
an event that is detected by the player that initiates the interaction;
a condition that is evaluated by the player when the event occurs; and
an action taken by the player in response to the event.

14. The method of claim 13,
wherein:
the event is a click on a link in the interactive graphical design; and
the analytics tool determines how many times the link was selected in the interactive session.

15. The method of claim 14,
wherein:
the analytics tool batch-processes the set of stored notifications to determine how often the link was selected in the interactive session.

* * * * *